W. DOWNHAM, Jr.
VEHICLE WHEEL.
APPLICATION FILED JULY 1, 1911.
1,061,458.
Patented May 13, 1913.
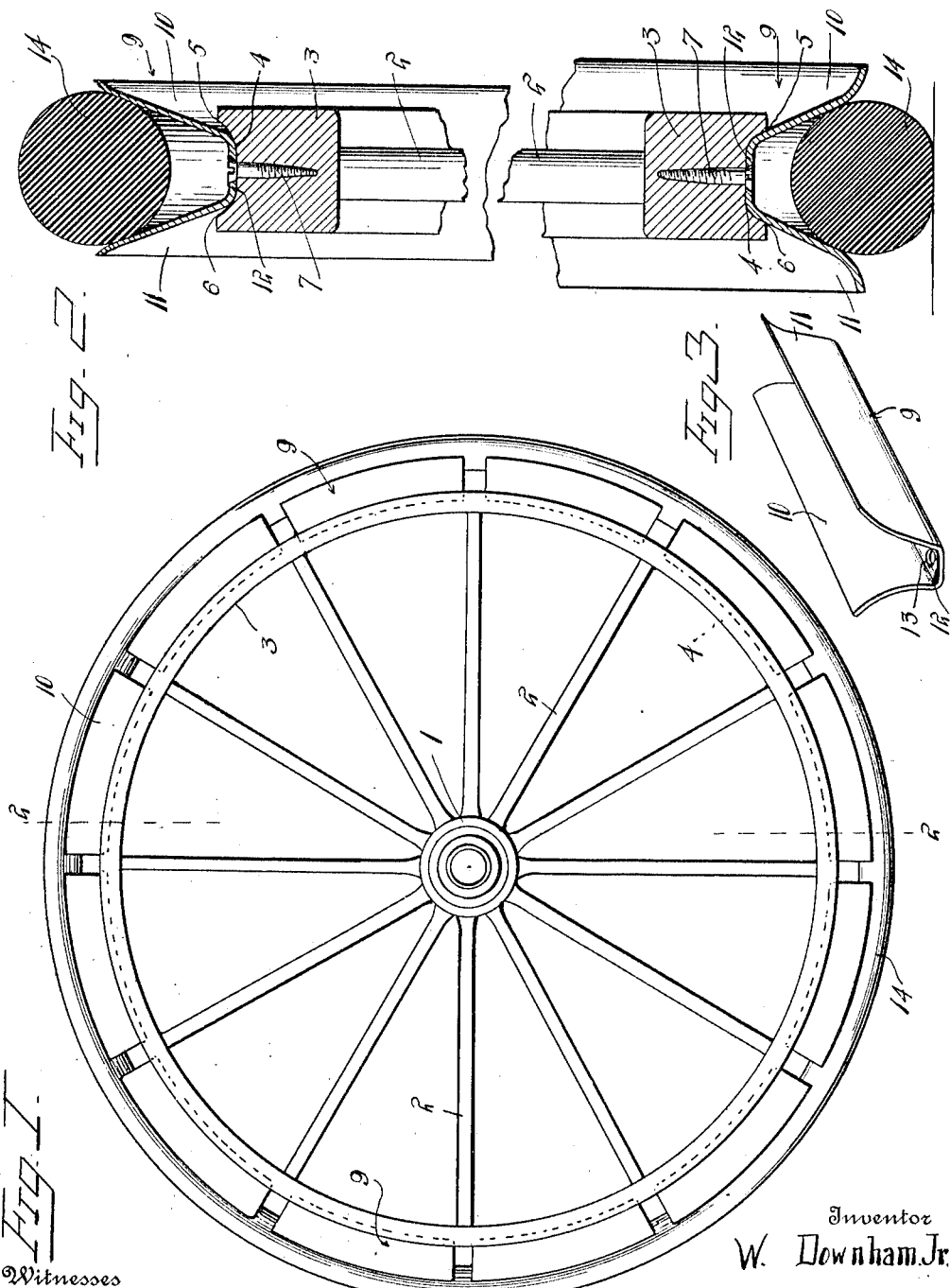
Inventor
W. Downham Jr.

UNITED STATES PATENT OFFICE.

WILLIAM DOWNHAM, JR., OF PHILADELPHIA, PENNSYLVANIA.

VEHICLE-WHEEL.

1,061,458. Specification of Letters Patent. Patented May 13, 1913.

Application filed July 1, 1911. Serial No. 636,352.

*To all whom it may concern:*

Be it known that I, WILLIAM DOWNHAM, Jr., a citizen of the United States, residing at Philadelphia, in the county of Philadelphia, State of Pennsylvania, have invented certain new and useful Improvements in Vehicle-Wheels; and I do hereby declare the following to be a full, clear, and exact description of the invention, such as will enable others skilled in the art to which it appertains to make and use the same.

My invention relates to new and useful improvements in spring wheels and the object of my invention is to improve the construction and increase the efficiency of wheels of the above described character.

A further object of my invention is to provide a spring wheel in which the wheel proper may be of the ordinary or any preferred type and in which the resiliency of the wheel is obtained by means of a plurality of separate supplemental felly sections formed of spring metal and movable under the influence of the wedging action of the tire. And a still further object of my invention is to so proportion and position these auxiliary felly sections as to cause the felly proper of the wheel to limit their outward motion and thus reinforce them to prevent breakage.

With these and other objects in view, my invention will be more fully described, illustrated in the drawings which show the preferred embodiment of my improved wheel and then specifically pointed out in the claim which is attached to and forms a part of this application.

In the drawings: Figure 1 is a side elevation of the wheel. Fig. 2 is a section on the line 2—2 of Fig. 1, and Fig. 3 is a detail perspective of one of the supplemental felly sections.

Referring more specifically to the drawings, in which similar reference numerals designate corresponding parts throughout, my wheel will be seen to consist of a hub 1, spokes 2 and a felly 3 which may all be of the customary or any preferred type with the exception that the felly is provided with a circumscribing peripheral channel 4 and annular flanges 5 and 6. Secured at fixed intervals within this channel and by any preferred means as screws 7 are a plurality of supplemental felly sections designated as a whole by the numeral 9. Referring more specifically to Fig. 3 of the drawings each of these sections will be seen to be formed from a single plate of resilient material, preferably spring steel, bent in segmental form and including side plates 10 and 11 and a central connecting web 12 toward which the side plates converge, the web portion of the plate being provided with apertures 13 adapted to receive the screws 7. These supplemental felly sections are secured in the channel of the felly proper, as best shown in Figs. 1 and 2 in such a manner that the side plates are in parallel spaced relation to the flanges of the felly and as shown, these side plates are so proportioned as to extend a considerable distance beyond the said flanges. Surrounding the wheel thus formed and disposed between the sides of the supplemental felly sections is a resilient tire 14 which may be of any preferred type of construction and which is normally held in spaced apart relation from the felly by means of the supplemental felly sections.

In operation the weight of the wheel and the vehicle supported thereby exert a down pressure upon that portion of the tire resting upon the ground forcing it upwardly between the resilient sides of the supplemental felly sections the yielding of which gives the desired resiliency to the wheel. In case the pressure so exerted is excessive, as when the tire strikes a stone or other obstruction the outer faces of the sides of the supplemental felly sections against which the pressure is exerted spring outwardly until they bear against the flanges of the felly proper which then reinforces them and prevents their breaking, said supplemental felly sections being so proportioned in size and strength that the sides of the felly channel will limit their outer movement at points short of their limits of elasticity.

From the foregoing description it will be apparent that I have provided an exceedingly simple and efficient form of spring wheel and it will also be seen that a wheel of the ordinary type may, with slight modifications, be remodeled to form the body of my improved wheel.

What is claimed is:—

In a wheel the combination with a felly having a circumscribed peripheral channel, of sections secured at spaced distances in said channel and having flared sides, the said sections being of suitable V-shaped form in cross section, the sides of the channel in the felly limiting the spreading of the said flared sides of the said sections, and a
5 tire of circular form in cross section seated between the sides of said sections and held in position by the latter.

In testimony whereof I affix my signature, in presence of two witnesses.

WILLIAM DOWNHAM, Jr.

Witnesses:
 MORGAN THOMAS HENDEL,
 HERNY MORMAN RICHARDS.

Copies of this patent may be obtained for five cents each, by addressing the "Commissioner of Patents, Washington, D. C."